(12) United States Patent
Chang et al.

(10) Patent No.: US 9,939,611 B2
(45) Date of Patent: Apr. 10, 2018

(54) OPTICAL LENS

(71) Applicants: Ching-Sheng Chang, Hsinchu (TW); Yen-Te Lee, Hsinchu (TW); Kuo-Chuan Wang, Hsinchu (TW)

(72) Inventors: Ching-Sheng Chang, Hsinchu (TW); Yen-Te Lee, Hsinchu (TW); Kuo-Chuan Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 28 days.

(21) Appl. No.: 14/565,429

(22) Filed: Dec. 10, 2014

(65) Prior Publication Data

US 2016/0170175 A1 Jun. 16, 2016

(51) Int. Cl.
*G02B 9/64* (2006.01)
*G02B 13/00* (2006.01)
*G02B 17/08* (2006.01)
*G02B 13/06* (2006.01)

(52) U.S. Cl.
CPC ............. *G02B 9/64* (2013.01); *G02B 13/006* (2013.01); *G02B 13/0045* (2013.01); *G02B 13/06* (2013.01); *G02B 17/08* (2013.01)

(58) Field of Classification Search
CPC .... G02B 9/64; G02B 13/0045; G02B 13/006; G02B 13/0065; G02B 13/16; G02B 13/18; G02B 17/08; G02B 17/0852
USPC .................. 359/708, 726, 754, 649
See application file for complete search history.

(56) References Cited

U.S. PATENT DOCUMENTS

| 6,188,523 | B1 * | 2/2001 | Choi ................. G02B 9/10 353/69 |
| 6,317,269 | B1 * | 11/2001 | Yamamoto ............... G02B 7/04 359/649 |
| 6,870,689 | B2 | 3/2005 | Yoshida |
| 6,989,946 | B2 | 1/2006 | Kobayashi et al. |
| 6,999,247 | B2 | 2/2006 | Kim |
| 7,170,687 | B2 | 1/2007 | Kobayashi |
| 7,355,799 | B2 | 4/2008 | Yamamoto |
| 7,436,597 | B2 | 10/2008 | Nagatoshi |
| 7,466,501 | B1 * | 12/2008 | Kang .................. G02B 9/12 359/649 |
| 7,477,459 | B2 * | 1/2009 | Liao ................... G02B 9/34 359/772 |
| 8,254,033 | B2 | 8/2012 | Huang et al. |
| 8,830,592 | B2 * | 9/2014 | Sato .................. G02B 15/177 359/682 |
| 2002/0057505 | A1 * | 5/2002 | Sato ................. G02B 13/06 359/753 |
| 2008/0137216 | A1 * | 6/2008 | Nagatoshi ............. G03B 21/10 359/714 |
| 2008/0144186 | A1 * | 6/2008 | Feng .................. G02B 3/14 359/666 |
| 2008/0291542 | A1 * | 11/2008 | Yamamoto ............ G02B 13/04 359/651 |

(Continued)

*Primary Examiner* — Jordan Schwartz
(74) *Attorney, Agent, or Firm* — JCIPRNET

(57) ABSTRACT

An optical lens including a first lens group and a second lens group is provided. The first lens group is disposed between a magnified side and a reduced side and has a negative refractive power. The first lens group includes four lenses. Two lenses closest to the magnified side in the first lens group are aspheric lenses. The second lens group is disposed between the first lens group and the reduced side and has a positive refractive power. The second lens group includes at least seven lenses.

15 Claims, 4 Drawing Sheets

(56) References Cited

U.S. PATENT DOCUMENTS

| | | | |
|---|---|---|---|
| 2009/0015935 A1* | 1/2009 | Szapiel | F41G 1/38 |
| | | | 359/674 |
| 2010/0265595 A1* | 10/2010 | Tochigi | G02B 15/177 |
| | | | 359/682 |
| 2014/0049835 A1* | 2/2014 | Yamada | G02B 13/04 |
| | | | 359/708 |
| 2014/0125858 A1* | 5/2014 | Sugita | G02B 15/177 |
| | | | 348/345 |
| 2015/0077724 A1* | 3/2015 | Baba | G02B 17/0852 |
| | | | 353/98 |
| 2015/0234167 A1* | 8/2015 | Ode | G02B 13/16 |
| | | | 359/432 |
| 2016/0139383 A1* | 5/2016 | Ichimura | G02B 15/177 |
| | | | 359/680 |

* cited by examiner

OPTICAL LENS

BACKGROUND OF THE INVENTION

1. Field of the Invention

The invention relates to an optical lens.

2. Description of Related Art

Optical lenses are key components in various optical systems, and usually determine the optical quality of the optical systems. An optical lens may be a projection lens which projects an image from an image source, for example, a light valve or a display, onto a screen or a lens forming a virtual image of an image source in a virtual image display. Alternatively, an optical lens may be an image-forming lens which forms a real image of an external subject onto an image sensor inside a camera.

Generally, a longer projection distance is required if a projector needs to projects an image onto a larger screen. Contrarily, a special wide-angle lens is usually required if the image needs to be projected onto the larger screen from a shorter projection distance. However, a wide viewing angle and a large aperture may cause aberration. How to reduce image aberration is one of the major subjects in the design of wide-angle lenses.

SUMMARY OF THE INVENTION

Accordingly, the invention is directed to an optical lens, which has a wider viewing angle, a larger aperture, and less aberration.

An embodiment of the invention provides an optical lens including a first lens group and a second lens group. The first lens group is disposed between a magnified side and a reduced side and has a negative refractive power. The first lens group includes four lenses. Two lenses closest to the magnified side in the first lens group are aspheric lenses. The second lens group is disposed between the first lens group and the reduced side and has a positive refractive power. The second lens group includes at least seven lenses.

An embodiment of the invention provides an optical lens including a first lens group and a second lens group. The first lens group is disposed between a magnified side and a reduced side and has a negative refractive power. The first lens group includes four lenses. Two lenses closest to the magnified side in the first lens group are aspheric lenses. A lens closest to the reduced side in the first lens group has a positive refractive power. The second lens group is disposed between the first lens group and the reduced side and has a positive refractive power. The optical lens satisfies $-2.55 < f_{G14}/f_{G1} < -2.23$, where $f_{G14}$ is a focal length of the lens closest to the reduced side in the first lens group, and $f_{G1}$ is a focal length of the first lens group.

An embodiment of the invention provides an optical lens including a first lens group, a second lens group, and a reflector. The first lens group is disposed between a magnified side and a reduced side and has a negative refractive power. The first lens group includes four lenses. Two lenses closest to the magnified side in the first lens group are aspheric lenses. The second lens group is disposed between the first lens group and the reduced side and has a positive refractive power. The reflector is disposed between the first lens group and the second lens group and configured to reflect light from the second lens group to the first lens group, wherein the optical lens satisfies $5.88 < d/f < 7.57$, where d is an interval along an optical axis of the optical lens between the first lens group and the second lens group, and f is an effective focal length of the optical lens.

In the optical lens according to the embodiment of the invention, a first lens group having a negative refractive power and including four lenses and a second lens group having a positive refractive power and including at least seven lenses are adopted, and two lenses closest to the magnified side in the first lens group are aspheric lenses, so that the optical lens may have a wider viewing angle, a larger aperture, and less aberration.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
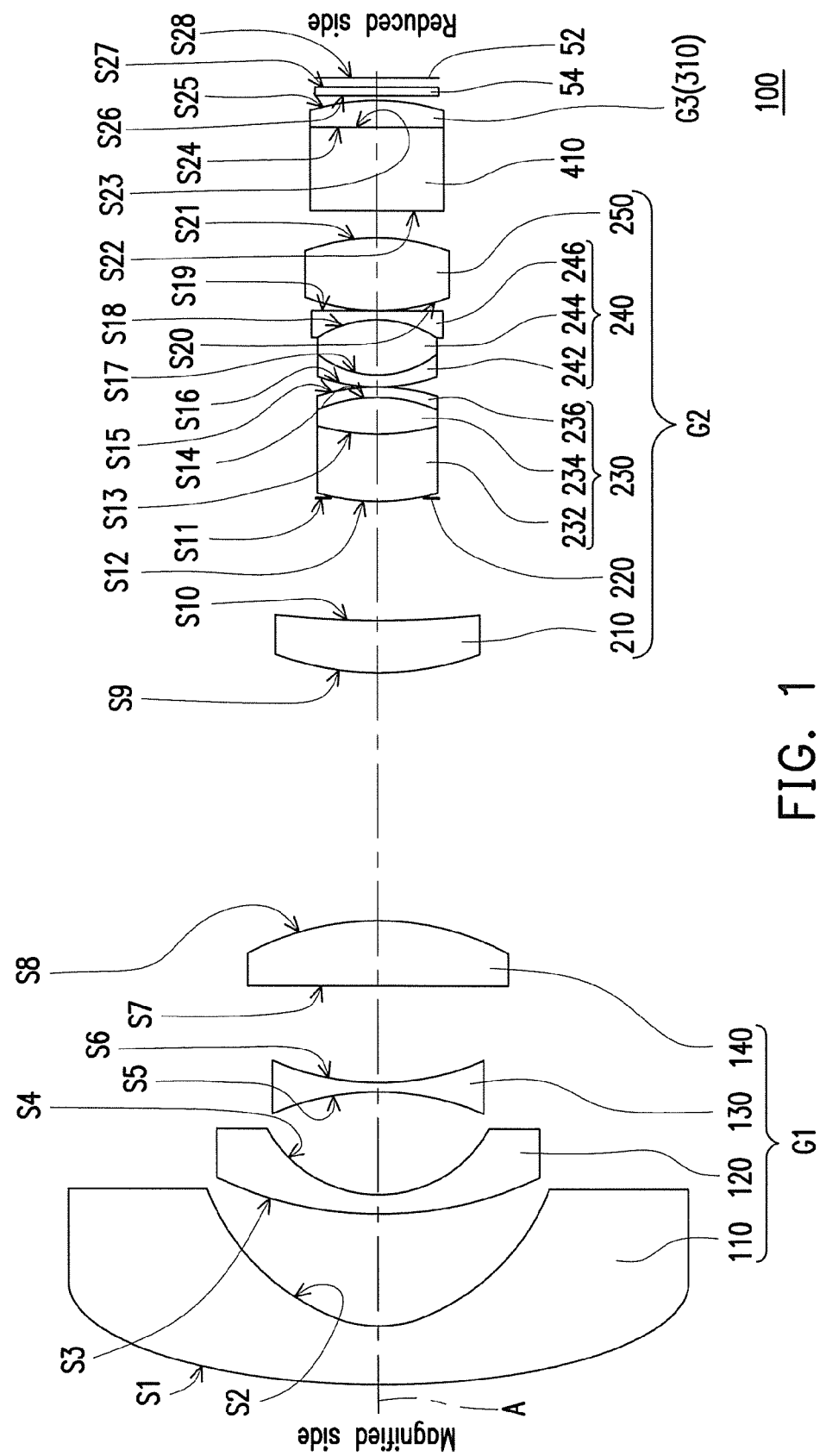
FIG. 1 is a schematic view of an optical lens according to an embodiment of the invention.

Reference will now be made in detail to the embodiments of the invention, examples of which are illustrated in the accompanying drawings. Wherever possible, the same reference numbers are used in the drawings and the description to refer to the same or like parts.

FIG. 1 is a schematic view of an optical lens according to an embodiment of the invention. Referring to FIG. 1, the optical lens 100 in this embodiment includes a first lens group G1 and a second lens group G2. The first lens group G1 is disposed between a magnified side and a reduced side and has a negative refractive power. The first lens group G1 includes four lenses. In this embodiment, the four lenses of the first lens group G1 includes a first lens 110 having a negative refractive power, a second lens 120 having a negative refractive power, a third lens 130 having a negative refractive power, and a fourth lens 140 having a positive refractive power arranged in sequence from the magnified side toward the reduced side. Two lenses closest to the magnified side in the first lens group G1 are aspheric lenses. In this embodiment, the first lens 110 and the second lens 120 are aspheric lenses.

The second lens group G2 is disposed between the first lens group G1 and the reduced side and has a positive refractive power. The second lens group G2 includes at least seven lenses. In this embodiment, the at least seven lenses in the second lens group G2 includes a fifth lens 210 having a positive refractive power, a first cemented lens 230, a second cemented lens 240, and a sixth lens 250 having a positive refractive power arranged in sequence from the magnified side toward the reduced side. In this embodiment, the first cemented lens 230 is a triple cemented lens and includes a seventh lens 232 having a negative refractive power, an eighth lens 234 having a positive refractive power, and a ninth lens 236 having a negative refractive power arranged in sequence from the magnified side toward the reduced side, and the second cemented lens 240 is a triple cemented lens and includes a tenth lens 242 having a negative refractive power, an eleventh lens 244 having a positive refractive power, and a twelfth lens 246 having a negative refractive power arranged in sequence from the magnified side toward the reduced side.

In the optical lens 100 in this embodiment, the first lens group G1 having a negative refractive power and including four lenses and the second lens group G2 having a positive refractive power and including at least seven lenses are adopted, and two lenses closest to the magnified side in the first lens group G1 are aspheric lenses, so that the optical lens 100 may have a wider viewing angle, a larger aperture, and less aberration.

In this embodiment, In order to reduce the astigmatism accompanied with the wider viewing angle and the larger aperture, a lens, i.e. the fourth lens 140, closest to the reduced side in the first lens group G1 has a positive refractive power, and the optical lens satisfies $-2.55 < f_{G14}/f_{G1} < -2.23$, where $f_{G14}$ is a focal length of the lens, i.e. the fourth lens 140, closest to the reduced side in the first lens group, and $f_{G1}$ is a focal length of the first lens group G1. If $f_{G14}/f_{G1} > -2.23$ or $f_{G14}/f_{G1} < -2.55$, then a large astigmatism occurs. In this embodiment, the fourth lens 140 may have a convex surface, i.e. the surface S8, facing the reduced side.

In this embodiment, in order to reduce the lateral color of the second lens group G2 and the axial color of the optical lens 100, the at least seven lenses in the second lens group G2 includes two triple cemented lens (i.e. the first cemented lens 230 and the second cemented lens 240), and an Abbe number of a lens having a positive refractive power in each of the two triple cemented lens (i.e. each of the Abbe numbers of the eighth lens 234 and the eleventh lens 244) is greater than 70. If any one of the aforementioned Abbe numbers is not greater than 70, the aforementioned lateral color and axial color are large.

In this embodiment, in order to reduce the size of the optical lens 100, the optical lens 100 further includes a third lens group G3 disposed between the second lens group G2 and the reduced side, wherein the third lens group G3 comprises a lens 310 having a positive refractive power. In order to reduce the distortion aberration and the lateral color of the first lens group G1 which are accompanied with the large viewing angle, the first lens 110 and the second lens 120 in the first lens group G1 are aspheric lenses, for example, plastic aspheric lenses. In some other embodiments, the optical lens 100 may not include the third lens group G3.

In this embodiment, the second lens group G2 further includes an aperture stop 220 disposed between the fifth lens 210 and the first cemented lens 230. In this embodiment, the lens 310 of the third lens group G3 having the positive refractive power is a field lens. A field lens changes a viewing angle of light but does substantially or nearly not change the position of the focal plane of the optical lens 100. In this embodiment, the lens 310 has a convex surface, i.e. the surface S25, facing the reduced side. In this embodiment, the optical lens 100 further includes a prism 410 disposed between the second lens group G2 and the third lens group G3, and an image source 52 is disposed on the reduced side. When the image source 52 is a liquid-crystal-on-silicon (LCOS) panel, the prism 410 may be a polarizing beam splitter (PBS) prism. When the image source 52 is a digital micro-mirror device (DMD), the prism 410 may be a total internal reflection (TIR) prism. A cover glass 54 is disposed between the third lens group G3 and the image source 52 to protect the image source 52. In some other embodiments, the image source 52 may be any other spatial light modulator or display.

In this embodiment, the optical lens 100 is, for example, a projection lens with a short focal length, which may be disposed in a projection optical system with a limited size. The optical lens 100 has a large viewing angle and a large aperture, e.g., the f-number is 1.88. Moreover, in this embodiment, the astigmatism and lateral color of the optical lens 100 with a short focal length are reduced. In this embodiment, the second lens group G2 is a focusing lens group, and the optical lens 100 may be a fixed-focus lens.

In this embodiment, the first lens 110 is a negative meniscus lens having a convex surface facing the magnified side; the second lens 120 is a negative meniscus lens having a convex surface facing the magnified side; the third lens 130 is a biconcave lens; the fourth lens 140 is a plano-convex lens having a convex surface facing the reduced side; the fifth lens 210 is a positive meniscus lens having a convex surface facing the magnified side; the seventh lens 232 is a negative meniscus lens having a convex surface facing the magnified side; the eighth lens 234 is a biconvex lens; the ninth lens 236 is a negative meniscus lens having a convex surface facing the reduced side; the tenth lens 242 is a negative meniscus lens having a convex surface facing the magnified side; the eleventh lens is a biconvex lens; the twelfth lens 246 is a plano-concave lens having a plane surface facing the reduced side; the sixth lens 250 is a biconvex lens; and the lens 310 is a plano-convex lens having a convex surface facing the reduced side.

An embodiment of the optical lens 100 is given hereinafter. It should be noted that the data listed in Tables 1 and 2 is not intended to limit the invention, and any person having ordinary skill in the art can make some appropriate alternations on the parameters or settings with reference to the disclosure of the invention, which do, however, not depart from the scope of the invention.

TABLE 1

| Surface | Radius of Curvature (mm) | Interval (mm) | Refractive Index | Abbe Number | Remarks |
|---|---|---|---|---|---|
| S1 | 128.27 | 10.00 | 1.492 | 58.0 | First lens |
| S2 | 16.85 | 20.40 | | | |
| S3 | 195.74 | 3.76 | 1.492 | 58.0 | Second lens |
| S4 | 38.80 | 17.78 | | | |
| S5 | −47.22 | 2.00 | 1.805 | 25.4 | Third lens |
| S6 | 47.22 | 16.78 | | | |
| S7 | infinity | 11.23 | 1.834 | 37.1 | Fourth lens |
| S8 | −52.24 | 44.62 | | | |
| S9 | 60.09 | 9.24 | 1.784 | 25.6 | Fifth lens |
| S10 | 345.28 | 21.09 | | | |
| S11 | infinity | 0.10 | | | Aperture stop |
| S12 | 62.94 | 11.63 | 1.737 | 32.2 | Seventh lens |
| S13 | 28.36 | 6.40 | 1.487 | 70.2 | Eighth lens |
| S14 | −28.36 | 2.00 | 1.800 | 34.9 | Ninth lens |
| S15 | −45.55 | 0.10 | | | |
| S16 | 39.01 | 2.17 | 1.749 | 35.2 | Tenth lens |
| S17 | 17.35 | 9.65 | 1.496 | 81.5 | Eleventh lens |
| S18 | −19.69 | 2.00 | 1.749 | 35.2 | Twelfth lens |
| S19 | infinity | 0.10 | | | |
| S20 | 49.78 | 12.78 | 1.496 | 81.5 | Sixth lens |
| S21 | −31.79 | 4.65 | | | |
| S22 | infinity | 15.00 | 1.516 | 64.1 | Prism |
| S23 | infinity | 0.00 | | | |
| S24 | infinity | 4.34 | 1.516 | 64.1 | Lens 310 |
| S25 | −46.61 | 1.40 | | | |
| S26 | infinity | 0.70 | 1.520 | 62.0 | Cover glass |
| S27 | infinity | 0.10 | | | |
| S28 | infinity | 0.00 | | | Image source |

In Table 1, the interval refers to a straight distance along the optical axis A between two neighboring surfaces. For example, the interval of surface S1 is the straight distance along the optical axis A between surface S1 and surface S2. The corresponding thickness, refractive index, and Abbe number of each lens in the Remarks column refers to the values, in the same row, corresponding to the interval, refractive index, and Abbe number. Moreover, in Table 1, the surfaces S1 and S2 are two surfaces of the first lens 110. The surfaces S3 and S4 are two surfaces of the second lens 120. The surfaces S5 and S6 are two surfaces of the third lens 130. The surfaces S7 and S8 are two surfaces of the fourth lens 140. The surfaces S9 and S10 are two surfaces of the fifth lens 210. The surface S11 is the aperture stop 220. The surface S12 is a surface of the seventh lens 232 facing the magnified side. The surface S13 is a surface connecting the seventh lens 232 and the eighth lens 234. The surface S14 is a surface connecting the eighth lens 234 and the ninth lens 236. The surface S15 is a surface of the ninth lens 236 facing the reduced side. The surface S16 is a surface of the tenth lens 242 facing the magnified side. The surface S17 is a surface connecting the tenth lens 242 and the eleventh lens 244. The surface S18 is a surface connecting the eleventh lens 244 and the twelfth lens 246. The surface S19 is a surface of the twelfth lens 246 facing the reduced side. The surfaces S20 and S21 are two surfaces of the sixth lens 250. The surfaces S22 and S23 are two surfaces of the prism 410. The surfaces S24 and S25 are two surfaces of the lens 310, wherein the lens 310 may adhere to or lean against the prism 410; that is, there may be substantially no distance between the surface S24 and the surface S23. The surfaces S26 and S27 are two surfaces of the cover glass 54. The surface S28 is the active surface, i.e. a light-emitting surface, of the image source 52.

The parameters such as the radius of curvature and the interval of each surface are given in Table 1 for reference, and will not be repeated herein.

The above surfaces S1, S2, S3, and S4 are aspheric surfaces, and may be expressed by the following formula:

$$Z = \frac{cr^2}{1 + \sqrt{1-(1+k)c^2r^2}} + A_2r^2 + A_4r^4 + A_6r^6 + A_8r^8 + A_{10}r^{10} + A_{12}r^{12} + A_{14}r^{14} + A_{16}r^{16} + \ldots$$

In the formula, Z is a sag along the optical axis A, and c is the reciprocal of the radius of the osculating sphere, i.e. the reciprocal of the radius of curvature (e.g., the radius of curvatures of S1, S2, S3, and S4 in Table 1) close to the optical axis A. k is a conic coefficient. r is an aspheric height, i.e., the height from the optical axis to the edge of the lens. $A_2$, $A_4$, $A_6$, $A_8$, $A_{10}$, $A_{12}$, $A_{14}$, $A_{16}$ . . . are aspheric coefficients, and $A_2$ is 0 in this embodiment. Moreover, $A_{16}$ and aspheric coefficients of variables having orders higher than 16 are also 0. The parameters of the surfaces S1, S2, S3, and S4 are listed in Table 2.

TABLE 2

| Aspheric Parameter | Conic Coefficient k | Coefficient $A_4$ | Coefficient $A_6$ | Coefficient $A_8$ |
|---|---|---|---|---|
| S1 | 2.38 | −3.89E−06 | 5.43E−09 | −3.47E−12 |
| S2 | −0.71 | −1.81E−05 | −1.89E−08 | 7.72E−11 |

TABLE 2-continued

| Aspheric Parameter | Coefficient $A_{10}$ | Coefficient $A_{12}$ | Coefficient $A_{14}$ |
|---|---|---|---|
| S1 | 1.30E−15 | −2.71E−19 | 2.48E−23 |
| S2 | −1.12E−13 | 8.63E−17 | −3.84E−20 |

| Aspheric Parameter | Conic Coefficient k | Coefficient $A_4$ | Coefficient $A_6$ | Coefficient $A_8$ |
|---|---|---|---|---|
| S3 | 27.41 | 1.13E−05 | −8.18E−09 | −3.36E−12 |
| S4 | 2.46 | 2.59E−05 | 9.55E−09 | 2.44E−11 |

| Aspheric Parameter | Coefficient $A_{10}$ | Coefficient $A_{12}$ | Coefficient $A_{14}$ |
|---|---|---|---|
| S3 | 2.18E−15 | 5.23E−19 | 2.21E−21 |
| S4 | −3.60E−13 | 8.48E−16 | −6.82E−19 |

"−3.89E−06" in Table 2 means "$-3.89 \times 10^{-6}$"; that is, the number following "E" means the exponent of the base "10", and so do the other parameters containing "E" in the tables in this application.

Figure 2:
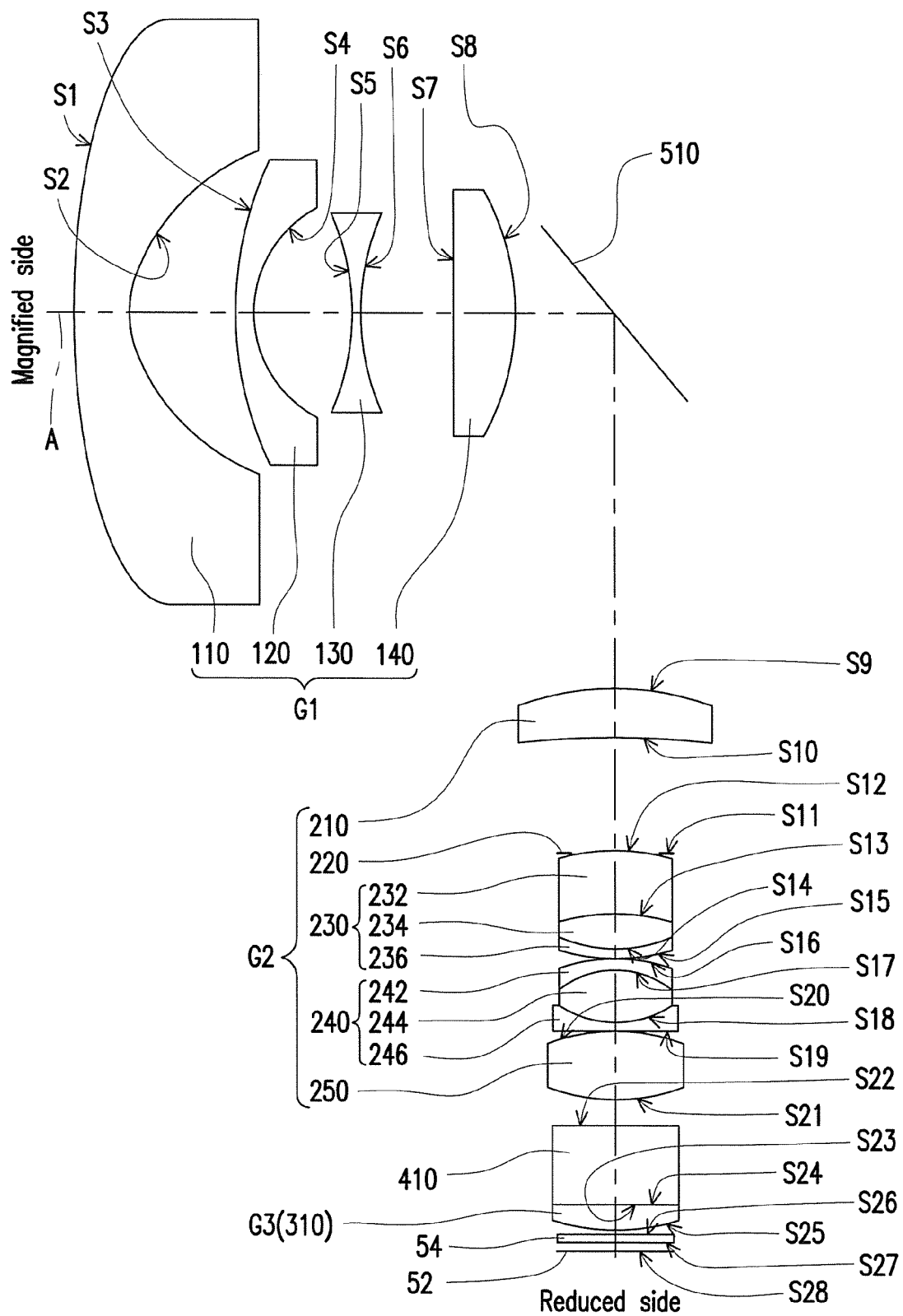
FIG. 2 is a schematic view of an optical lens according to another embodiment of the invention.

FIG. 2 is a schematic view of an optical lens according to another embodiment of the invention. Referring to FIG. 2, the optical lens 100a in this embodiment is similar to the optical lens 100 in FIG. 1, and the main difference is as follows. In this embodiment, in order to reduce the space occupied by the optical lens 100a, the optical lens 100a further includes a reflector 510 disposed between the first lens group G1 and the second lens group G2 and configured to reflect light from the second lens group G2 to the first lens group G1, wherein the optical lens satisfies 5.88<d/f<7.57, where d is an interval along an optical axis of the optical lens between the first lens group and the second lens group, and f is an effective focal length of the optical lens. In this embodiment, as shown in FIG. 2, the optical axis A is L-shaped, and the interval is along an L-shaped path. If d/f<5.88, the space for disposing the reflector 510 is not enough. If d/f>7.57, the image quality is not good. The reflector 510 may be a mirror or a reflective prism.

Figure 3:
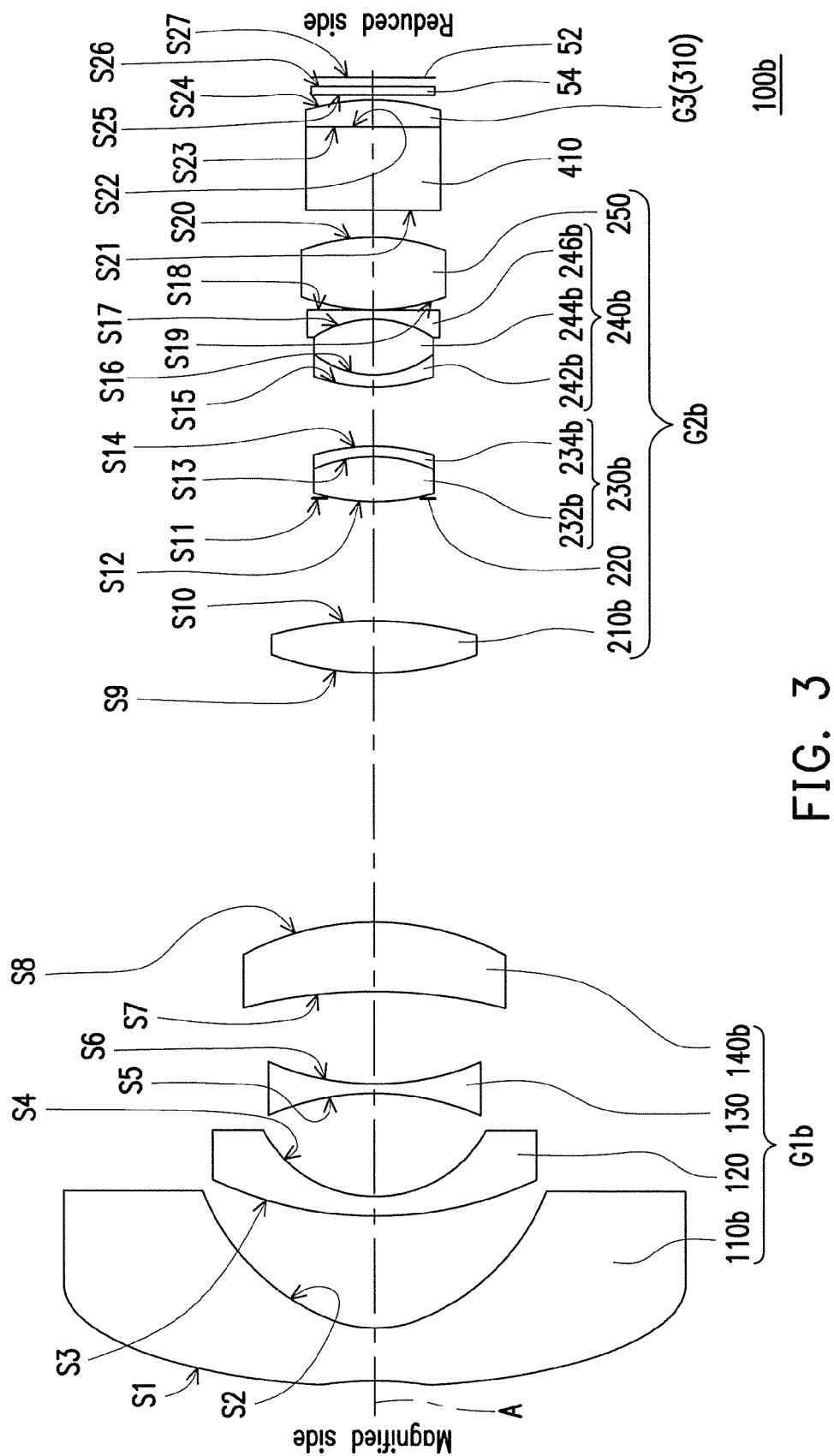
FIG. 3 is a schematic view of an optical lens according to another embodiment of the invention.

FIG. 3 is a schematic view of an optical lens according to another embodiment of the invention. Referring to FIG. 3, the optical lens 100b in this embodiment is similar to the optical lens 100 in FIG. 1, and the main difference is as follows. In the optical lens 100b, the first cemented lens 230b of the second lens group G2b is a double cemented lens and includes a seventh lens 232b having a positive refractive power and an eighth lens 234b having a negative refractive power arranged in sequence from the magnified side toward the reduced side, and the second cemented lens 240b of the second lens group G2b is a triple cemented lens and includes a ninth lens 242 having a negative refractive power, a tenth lens 244 having a positive refractive power, and an eleventh lens 246b having a negative refractive power arranged in sequence from the magnified side toward the reduced side.

In this embodiment, the first lens 110b of the first lens group G1b is a biconcave lens, and the fourth lens 140b of the first lens group G1b is a positive meniscus lens having a convex surface facing the reduced side. Moreover, in this embodiment, the fifth lens 210b is a biconvex lens, the seventh lens 232b is a biconvex lens, the eighth lens 234b is a negative meniscus lens having convex surface facing the reduced side, the ninth lens 242b is a negative meniscus lens having convex surface facing the magnified side, the tenth lens 244b is a biconvex lens, and the eleventh lens 246b is a negative meniscus lens having a convex surface facing the reduced side. In this embodiment, the sixth lens 250 is a spherical lens. However, in another embodiment, a lens, e.g.

the sixth lens 250, closest to the reduced side in the second lens group G2b is an aspheric lens.

In some other embodiments, the optical lens 100b may include a reflector, e.g. the reflector 510 as shown in FIG. 2, disposed between the first lens group G1b and the second lens group G2b and configured to reflect light from the second lens group G2b to the first lens group G1b.

An embodiment of the optical lens 100b is given hereinafter, but the invention is not limited to this. Please refer to FIG. 3 and Tables 3 and 4.

TABLE 3

| Surface | Radius of Curvature (mm) | Interval (mm) | Refractive Index | Abbe Number | Remarks |
|---|---|---|---|---|---|
| S1 | −262.54 | 9.14 | 1.492 | 58.0 | First lens |
| S2 | 20.85 | 18.61 | | | |
| S3 | 289.12 | 3.50 | 1.492 | 58.0 | Second lens |
| S4 | 40.21 | 14.83 | | | |
| S5 | −90.59 | 2.00 | 1.846 | 23.7 | Third lens |
| S6 | 44.82 | 9.64 | | | |
| S7 | −50.14 | 12.00 | 1.805 | 25.4 | Fourth lens |
| S8 | −36.84 | 45.00 | | | |
| S9 | 69.30 | 5.70 | 1.743 | 44.7 | Fifth lens |
| S10 | −156.50 | 30.89 | | | |
| S11 | infinity | 0.20 | | | Aperture stop |
| S12 | 109.53 | 4.58 | 1.496 | 81.5 | Seventh lens |
| S13 | −27.91 | 2.00 | 1.800 | 34.9 | Eighth lens |
| S14 | −62.27 | 16.27 | | | |
| S15 | 36.68 | 2.00 | 1.799 | 29.8 | Ninth lens |
| S16 | 17.13 | 10.14 | 1.496 | 81.5 | Tenth lens |
| S17 | −20.74 | 2.00 | 1.762 | 40.1 | Eleventh lens |
| S18 | −224.26 | 0.10 | | | |
| S19 | 43.08 | 6.21 | 1.496 | 81.5 | Sixth lens |
| S20 | −36.87 | 3.36 | | | |
| S21 | infinity | 15.00 | 1.516 | 64.1 | Prism |
| S22 | infinity | 0.00 | | | |
| S23 | infinity | 4.34 | 1.516 | 64.1 | Lens 310 |
| S24 | −46.61 | 1.40 | | | |
| S25 | infinity | 0.70 | 1.520 | 62.0 | Cover glass |
| S26 | infinity | 0.20 | | | |
| S27 | infinity | 0.00 | | | Image source |

In Table 3, the surfaces S1 and S2 are two surfaces of the first lens 110b. The surfaces S7 and S8 are two surfaces of the fourth lens 140b. The surfaces S9 and S10 are two surfaces of the fifth lens 210b. The surface S12 is a surface of the seventh lens 232b facing the magnified side. The surface S13 is a surface connecting the seventh lens 232b and the eighth lens 234b. The surface S14 is a surface of the eighth lens 234b facing the reduced side. The surface S15 is a surface of the ninth lens 242b facing the magnified side. The surface S16 is a surface connecting the ninth lens 242b and the tenth lens 244b. The surface S17 is a surface connecting the tenth lens 244b and the eleventh lens 246b. The surface S18 is a surface of the eleventh lens 246b facing the reduced side. The surfaces S19 and S20 are two surfaces of the sixth lens 250. The surfaces S21 and S22 are two surfaces of the prism 410. The surfaces S23 and S24 are two surfaces of the lens 310, wherein the lens 310 may adhere to or lean against the prism 410; that is, there may be substantially no distance between the surface S23 and the surface S22. The surfaces S25 and S26 are two surfaces of the cover glass 54. The surface S27 is the active surface, i.e. a light-emitting surface, of the image source 52.

The above surfaces 51, S2, S3, and S4 are aspheric surfaces, and may be expressed by the aforementioned aspheric formula. The parameters of the surfaces S1, S2, S3, and S4 are listed in Table 4, wherein $A_2$ is 0 in this embodiment, $A_{16}$'s of the surfaces S13 and 14 are zero, and $A_{18}$ and aspheric coefficients of variables having orders higher than 18 are also 0.

TABLE 4

| Aspheric Parameter | Conic Coefficient k | Coefficient $A_4$ | Coefficient $A_6$ | Coefficient $A_8$ |
|---|---|---|---|---|
| S1 | −99.00 | 5.23E−06 | −3.83E−09 | 3.20E−12 |
| S2 | −2.26 | 1.17E−05 | −3.28E−08 | 1.32E−10 |

| Aspheric Parameter | Coefficient $A_{10}$ | Coefficient $A_{12}$ | Coefficient $A_{14}$ | Coefficient $A_{16}$ |
|---|---|---|---|---|
| S1 | −2.16E−15 | 9.48E−19 | −2.32E−22 | 2.43E−26 |
| S2 | −2.13E−13 | 1.28E−16 | −2.28E−20 | 2.98E−24 |

| Aspheric Parameter | Conic Coefficient k | Coefficient $A_4$ | Coefficient $A_6$ | Coefficient $A_8$ |
|---|---|---|---|---|
| S3 | 99.00 | 2.89E−05 | −6.62E−08 | 4.57E−11 |
| S4 | 3.02 | 5.41E−05 | 1.27E−08 | −6.33E−10 |

| Aspheric Parameter | Coefficient $A_{10}$ | Coefficient $A_{12}$ | Coefficient $A_{14}$ | Coefficient $A_{16}$ |
|---|---|---|---|---|
| S3 | −2.05E−14 | 3.96E−17 | −2.96E−20 | 0.00E+00 |
| S4 | 2.43E−12 | −3.78E−15 | 1.41E−18 | 0.00E+00 |

Figure 4:
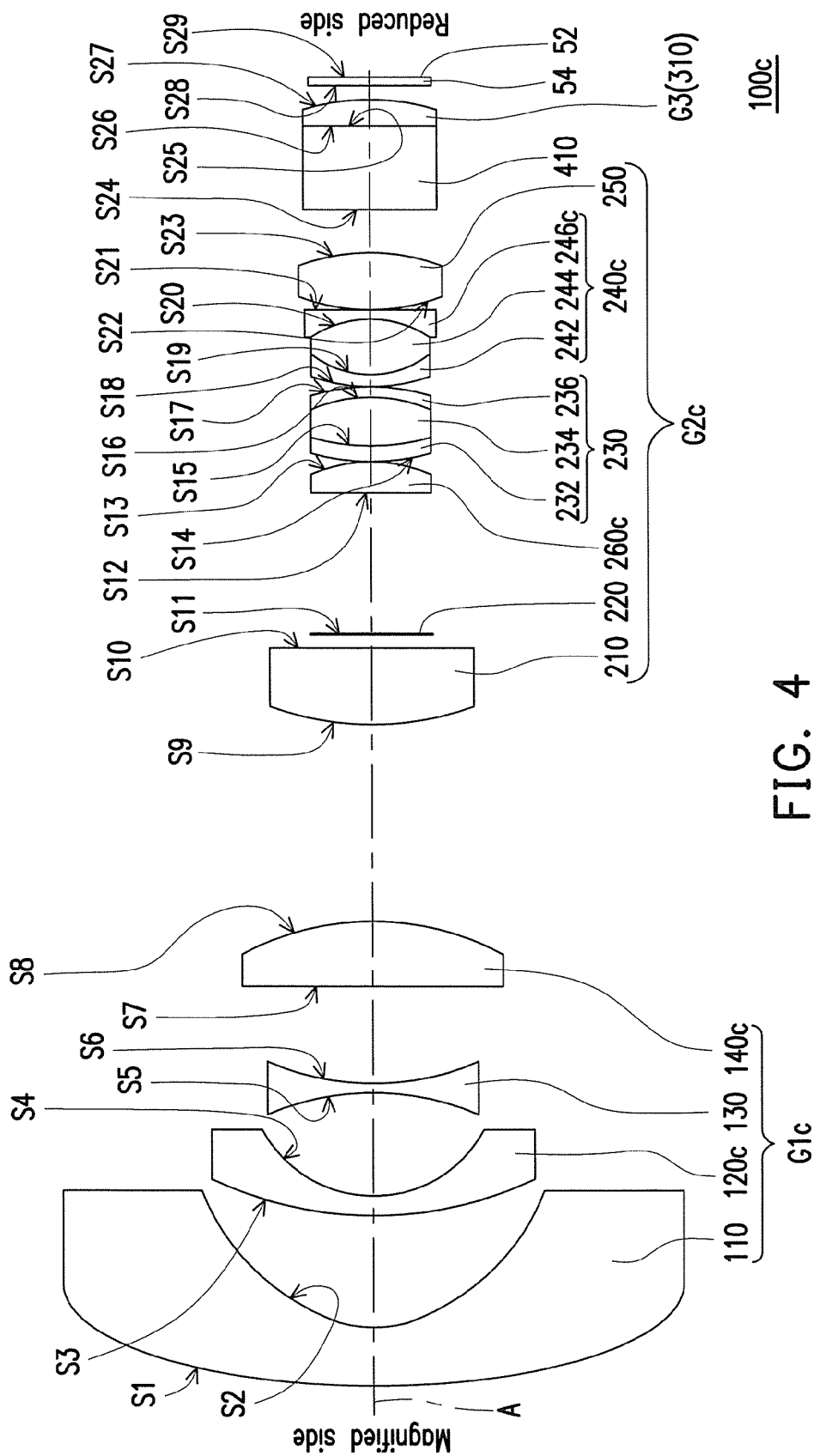
FIG. 4 is a schematic view of an optical lens according to another embodiment of the invention.

FIG. 4 is a schematic view of an optical lens according to another embodiment of the invention. Referring to FIG. 4, the optical lens 100c in this embodiment is similar to the optical lens 100 in FIG. 1, and the main difference is as follows. In the optical lens 100c, the second lens group G2c further includes a thirteenth lens 260c having a positive refractive power and disposed between the fifth lens 210 and the first cemented lens 230.

In this embodiment, the second lens 120c in the first lens group G1c is a biconcave lens, which is an aspheric lens. The fourth lens 140c is a biconvex lens. The thirteenth lens 260c is a plano-convex lens having a convex surface facing the reduced side. The twelfth lens 246c of the second cemented lens 240c of the second lens group G2c is a biconcave lens. In this embodiment, the aperture stop 220 is disposed between the fifth lens 210 and the thirteenth lens 260c.

In some other embodiments, the optical lens 100c may include a reflector, e.g. the reflector 510 as shown in FIG. 2, disposed between the first lens group G1c and the second lens group G2c and configured to reflect light from the second lens group G2c to the first lens group G1c.

An embodiment of the optical lens 100c is given hereinafter, but the invention is not limited to this. Please refer to FIG. 4 and Tables 5 and 6.

TABLE 5

| Surface | Radius of Curvature (mm) | Interval (mm) | Refractive Index | Abbe Number | Remarks |
|---|---|---|---|---|---|
| S1 | 54.67 | 15.09 | 1.492 | 58.0 | First lens |
| S2 | 13.89 | 25.17 | | | |
| S3 | −2528.33 | 4.23 | 1.492 | 58.0 | Second lens |
| S4 | 38.42 | 14.38 | | | |
| S5 | −55.73 | 4.07 | 1.846 | 23.7 | Third lens |
| S6 | 43.10 | 16.85 | | | |
| S7 | 1490.76 | 8.09 | 1.834 | 37.1 | Fourth lens |
| S8 | −47.50 | 45.00 | | | |
| S9 | 55.66 | 15.00 | 1.805 | 25.4 | Fifth lens |
| S10 | 289.16 | 3.04 | | | |
| S11 | infinity | 12.75 | | | Aperture stop |
| S12 | infinity | 3.53 | 1.733 | 51.4 | Thirteenth lens |
| S13 | −94.12 | 0.29 | | | |
| S14 | 58.86 | 2.01 | 1.688 | 31.0 | Seventh lens |
| S15 | 21.88 | 8.22 | 1.487 | 70.2 | Eighth lens |
| S16 | −26.93 | 1.90 | 1.800 | 34.9 | Ninth lens |
| S17 | −80.87 | 0.24 | | | |

TABLE 5-continued

| Surface | Radius of Curvature (mm) | Interval (mm) | Refractive Index | Abbe Number | Remarks |
|---|---|---|---|---|---|
| S18 | 33.97 | 2.01 | 1.749 | 35.2 | Tenth lens |
| S19 | 17.73 | 10.36 | 1.496 | 81.5 | Eleventh lens |
| S20 | −23.28 | 2.00 | 1.749 | 35.2 | Twelfth lens |
| S21 | 108.43 | 0.24 | | | |
| S22 | 42.29 | 6.72 | 1.496 | 81.5 | Sixth lens |
| S23 | −33.85 | 3.46 | | | |
| S24 | infinity | 15.00 | 1.516 | 64.1 | Prism |
| S25 | infinity | 0.20 | | | |
| S26 | infinity | 4.34 | 1.516 | 64.1 | Lens 310 |
| S27 | −46.61 | 1.50 | | | |
| S28 | infinity | 0.70 | 1.520 | 62.0 | Cover glass |
| S29 | infinity | 0.00 | | | Image source |

In Table 5, the surfaces S3 and S4 are two surfaces of the second lens 120c. The surfaces S7 and S8 are two surfaces of the fourth lens 140c. The surfaces S9 and S10 are two surfaces of the fifth lens 210. The surface S11 is the aperture stop 220. The surfaces S12 and S13 are two surfaces of the thirteenth lens 260c. The surface S14 is a surface of the seventh lens 232 facing the magnified side. The surface S15 is a surface connecting the seventh lens 232 and the eighth lens 234. The surface S 16 is a surface connecting the eighth lens 234 and the ninth lens 236. The surface S17 is a surface of the ninth lens 236 facing the reduced side. The surface S18 is a surface of the tenth lens 242 facing the magnified side. The surface S19 is a surface connecting the tenth lens 242 and the eleventh lens 244. The surface S20 is a surface connecting the eleventh lens 244 and the twelfth lens 246c. The surface S21 is a surface of the twelfth lens 246c facing the reduced side. The surfaces S22 and S23 are two surfaces of the sixth lens 250. The surfaces S24 and S25 are two surfaces of the prism 410. The surfaces S26 and S27 are two surfaces of the lens 310, wherein the lens 310 may adhere to or lean against the prism 410; that is, there may be substantially no distance between the surface S26 and the surface S25. The surfaces S28 is the surface of the cover glass 54 facing the magnified side. The surface S29 is the active surface, i.e. a light-emitting surface, of the image source 52. Moreover, the surface of the cover glass 54 facing the reduced side leans against the surface S29.

The above surfaces S1, S2, S3, and S4 are aspheric surfaces, and may be expressed by the aforementioned aspheric formula. The parameters of the surfaces S1, S2, S3, and S4 are listed in Table 6, wherein $A_2$ is 0 in this embodiment, and $A_{16}$ and aspheric coefficients of variables having orders higher than 16 are also 0.

TABLE 6

| Aspheric Parameter | Conic Coefficient k | Coefficient $A_4$ | Coefficient $A_6$ | Coefficient $A_8$ |
|---|---|---|---|---|
| S1 | −0.19 | −6.60E−06 | 3.72E−09 | −1.07E−12 |
| S2 | −0.80 | −1.87E−05 | −2.81E−08 | 5.77E−11 |

| Aspheric Parameter | Coefficient $A_{10}$ | Coefficient $A_{12}$ | Coefficient $A_{14}$ |
|---|---|---|---|
| S1 | 6.76E−17 | 2.95E−20 | −5.37E−24 |
| S2 | −2.87E−14 | 6.08E−18 | −2.55E−20 |

TABLE 6-continued

| Aspheric Parameter | Conic Coefficient k | Coefficient $A_4$ | Coefficient $A_6$ | Coefficient $A_8$ |
|---|---|---|---|---|
| S3 | 0.00 | 2.14E−05 | −1.55E−08 | −2.46E−11 |
| S4 | 0.00 | 4.09E−05 | 4.65E−08 | −1.56E−10 |

| Aspheric Parameter | Coefficient $A_{10}$ | Coefficient $A_{12}$ | Coefficient $A_{14}$ |
|---|---|---|---|
| S3 | 2.35E−14 | 0.00E+00 | 0.00E+00 |
| S4 | 8.60E−14 | 0.00E+00 | 0.00E+00 |

In conclusion, in the optical lens according to the embodiment of the invention, a first lens group having a negative refractive power and including four lenses and a second lens group having a positive refractive power and including at least seven lenses are adopted, and two lenses closest to the magnified side in the first lens group are aspheric lenses, so that the optical lens may have a wider viewing angle, a larger aperture, and less aberration.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical lens comprising:
   a first lens group disposed between a magnified side and a reduced side and having a negative refractive power, the first lens group comprising four lenses, wherein the two lenses closest to the magnified side in the first lens group are aspheric lenses; and
   a second lens group disposed between the first lens group and the reduced side and having a positive refractive power, and the lens closest to the reduced side in the second lens group is an aspheric lens, the second lens group comprising at least seven lenses,
   wherein the at least seven lenses in the second lens group comprises two triple cemented lens components,
   wherein each of the two triple cemented lens components comprises at least one lens having a positive refractive power, wherein the Abbe numbers of the lenses having positive refractive power in each of the two triple cemented lens components are each greater than 70.

2. The optical lens according to claim 1, wherein the lens closest to the reduced side in the first lens group has a positive refractive power, and the optical lens satisfies −2.55<fG14/fG1<−2.23, where fG14 is a focal length of the lens closest to the reduced side in the first lens group, and fG1 is a focal length of the first lens group.

3. The optical lens according to claim 1, wherein the lens closest to the reduced side in the first lens group has a positive refractive power and has a convex surface facing the reduced side.

4. The optical lens according to claim 1 further comprising a reflector disposed between the first lens group and the second lens group and configured to reflect light from the second lens group to the first lens group, wherein the optical lens satisfies 5.88<d/f<7.57, where d is an interval along an optical axis of the optical lens between the first lens group and the second lens group, and f is an effective focal length of the optical lens.

5. The optical lens according to claim 1 further comprising a third lens group disposed between the second lens group and the reduced side, wherein the third lens group comprises a lens having a positive refractive power.

6. The optical lens according to claim 5, wherein the lens of the third lens group having the positive refractive power is a field lens.

7. The optical lens according to claim 5, wherein the lens of the third lens group having the positive refractive power has a convex surface facing the reduced side.

8. The optical lens according to claim 5 further comprising a prism disposed between the second lens group and the third lens group.

9. The optical lens according to claim 1, wherein the four lenses of the first lens group comprise a first lens having a negative refractive power, a second lens having a negative refractive power, a third lens having a negative refractive power, and a fourth lens having a positive refractive power arranged in sequence from the magnified side toward the reduced side.

10. The optical lens according to claim 1, wherein the at least seven lenses in the second lens group comprises a fifth lens having a positive refractive power, a first cemented lens component, a second cemented lens component, and a sixth lens having refractive power arranged in sequence from the magnified side toward the reduced side.

11. The optical lens according to claim 10, wherein the first cemented lens component comprises a seventh lens having a negative refractive power, an eighth lens having a positive refractive power, and a ninth lens having a negative refractive power arranged in sequence from the magnified side toward the reduced side, and the second cemented lens component comprises a tenth lens having a negative refractive power, an eleventh lens having a positive refractive power, and a twelfth lens having a negative refractive power arranged in sequence from the magnified side toward the reduced side.

12. The optical lens according to claim 11, wherein the second lens group further comprises a thirteenth lens having a positive refractive power and disposed between the fifth lens and the first cemented lens component.

13. The optical lens according to claim 10, wherein the second lens group further comprises an aperture stop disposed between the fifth lens and the first cemented lens component.

14. The optical lens according to claim 1, wherein the second lens group is a focusing lens group.

15. An optical lens comprising:
a first lens group disposed between a magnified side and a reduced side and having a negative refractive power, the first lens group comprising four lenses, wherein the two lenses closest to the magnified side in the first lens group are aspheric lenses; and
a second lens group disposed between the first lens group and the reduced side and having a positive refractive power, the second lens group comprising at least seven lenses,
wherein the at least seven lenses in the second lens group comprises a fifth lens having a positive refractive power, a first cemented lens component, a second cemented lens component, and a sixth lens having refractive power arranged in sequence from the magnified side toward the reduced side,
wherein the first cemented lens component is a double cemented lens component and comprises a seventh lens having a positive refractive power and an eighth lens having a negative refractive power arranged in sequence from the magnified side toward the reduced side, and the second cemented lens component is a triple cemented lens component and comprises a ninth lens having a negative refractive power, a tenth lens having a positive refractive power, and an eleventh lens having a negative refractive power arranged in sequence from the magnified side toward the reduced side.

* * * * *